United States Patent
Halliday

(10) Patent No.: US 10,557,955 B2
(45) Date of Patent: Feb. 11, 2020

(54) RECONSTRUCTING IMPULSIVE SOURCE SEISMIC DATA FROM TIME DISTRIBUTED FIRING AIRGUN ARRAY DATA

(71) Applicant: WESTERNGECO LLC, Houston, TX (US)

(72) Inventor: David Fraser Halliday, Cambridge (GB)

(73) Assignee: WESTERNGECO L.L.C., Houston, TX (US)

(*) Notice: Subject to any disclaimer, the term of this patent is extended or adjusted under 35 U.S.C. 154(b) by 522 days.

(21) Appl. No.: 15/127,334

(22) PCT Filed: Mar. 19, 2015

(86) PCT No.: PCT/US2015/021531
§ 371 (c)(1),
(2) Date: Sep. 19, 2016

(87) PCT Pub. No.: WO2015/143195
PCT Pub. Date: Sep. 24, 2015

(65) Prior Publication Data
US 2017/0184746 A1    Jun. 29, 2017

Related U.S. Application Data

(60) Provisional application No. 61/968,167, filed on Mar. 20, 2014.

(51) Int. Cl.
*G01V 1/30* (2006.01)
*G01V 1/38* (2006.01)

(52) U.S. Cl.
CPC .............. *G01V 1/306* (2013.01); *G01V 1/307* (2013.01); *G01V 1/38* (2013.01); *G01V 1/3808* (2013.01);
(Continued)

(58) Field of Classification Search
None
See application file for complete search history.

(56) References Cited

U.S. PATENT DOCUMENTS 4,739,858 A * 4/1988 Dragoset, Jr. .......... G01V 1/006
                                                        181/115
5,703,833 A    12/1997 Allen
(Continued)

FOREIGN PATENT DOCUMENTS

| CN | 1166963 A | 12/1997 |
| CN | 103314310 A | 9/2013 |

(Continued)

OTHER PUBLICATIONS

Abma, R. et al., "Popcorn shooting: Sparse inversion and the distribution of airgun array energy over time", 83rd Annual International Meeting, 2013, SEG, Expanded Abstracts, pp. 31-35.
(Continued)

*Primary Examiner* — Roy Y Yi
*Assistant Examiner* — Geoffrey T Evans

(57) ABSTRACT

Acquiring seismic data using time-distributed sources and converting the acquired data into impulsive data using a multiple-frequency approach. The methods are performed in frequency-source location domain, frequency-wavenumber domain, or frequency-slowness domain. The methods are applicable to single source acquisition or simultaneous source acquisition.

17 Claims, 8 Drawing Sheets

(52) U.S. Cl.
CPC ...... *G01V 1/3861* (2013.01); *G01V 2210/127* (2013.01); *G01V 2210/62* (2013.01)

(56) References Cited

U.S. PATENT DOCUMENTS

| | | | |
|---|---|---|---|
| 7,876,642 B2 | 1/2011 | Robertsson et al. | |
| 8,395,966 B2 | 3/2013 | Moore et al. | |
| 8,837,255 B2* | 9/2014 | Ross | G01V 1/006 367/24 |
| 8,902,697 B2 | 12/2014 | Moore | |
| 9,874,646 B2* | 1/2018 | Hegna | G01V 1/003 |
| 2009/0168600 A1 | 7/2009 | Moore et al. | |
| 2010/0039894 A1* | 2/2010 | Abma | G01V 1/005 367/52 |
| 2010/0265797 A1 | 10/2010 | Robertsson et al. | |
| 2012/0033525 A1 | 2/2012 | Abma et al. | |
| 2012/0147701 A1 | 6/2012 | Ross et al. | |
| 2013/0003500 A1 | 1/2013 | Neelamani et al. | |
| 2013/0135965 A1* | 5/2013 | Ji | G01V 1/364 367/21 |
| 2014/0278116 A1 | 9/2014 | Halliday et al. | |
| 2016/0047931 A1* | 2/2016 | Chiu | G01V 1/364 367/24 |
| 2016/0054465 A1* | 2/2016 | Lamont | G01V 1/368 367/24 |

FOREIGN PATENT DOCUMENTS

| | | |
|---|---|---|
| CN | 103454672 A | 12/2013 |
| WO | WO2013080128 A1 | 6/2013 |

OTHER PUBLICATIONS

Kao, H. et al., "The Source Scanning Algorithm: mapping the distribution of seismic sources in time and space", Geophysics Journal International, 2014, 157, pp. 589-594.

Ozbek, O, et al., "Interpolation by matching pursuit", 79th Annual International Meeting, SEG Expanded Abstracts, 2009, pp. 3254-3257.

Robertsson, J. O. et al., "Full-wavefield, Towed-marine Seismic Acquisition and Applications", 74th EAGE Conference and Exhibition, Extended Abstracts, 2012, 5 pages.

Ziolkowski, A.,"The Delft airgun experiment", First Break, 1984, 2(6), pp. 9-18.

First Office Action of Chinese Patent Application No. 201580023848.9 dated Feb. 1, 2018, 5 pages.

Supplementary Search Report of European Patent Application No. 15765803.0 dated Sep. 13, 2017, pp. 1-3.

94(3) Exam of European Patent Application No. 15765803.0 dated Feb. 8, 2018, pp. 1-5.

International Preliminary Report on Patentability of International Patent Application No. PCT/US2015/021531 dated Sep. 29, 2016, 7 pages.

Chen, S. et al., "Application of Array Signal Processing in Seismic Exploration", Jiangsu Geology, 2006, pp. 46-49.

* cited by examiner

RECONSTRUCTING IMPULSIVE SOURCE SEISMIC DATA FROM TIME DISTRIBUTED FIRING AIRGUN ARRAY DATA

CROSS-REFERENCE TO RELATED APPLICATION

This application claims benefit of U.S. Provisional Patent App. Ser. No. 61/968,167 filed Mar. 20, 2014, which is herein incorporated by reference in its entirety.

BACKGROUND

This disclosure relates to seismic exploration for oil and gas and relates, in particular but not by way of limitation, to seismic data acquisition with time-distributed sources and the processing of the acquired data.

Seismic exploration involves surveying subterranean geological formations for hydrocarbon deposits. A survey may involve deploying seismic source(s) and seismic sensors at predetermined locations. The sources generate seismic waves, which propagate into the geological formations, creating pressure changes and vibrations along the way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones); others are sensitive to particle motion (e.g., geophones). Industrial surveys may deploy one type of sensor or both types. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel. Seismic surveys may be conducted in an area between land and sea, which is referred to as the "transition zone". Other surveys, incorporating both hydrophones and geophones, may be conducted on the seabed.

In marine surveys, airguns or arrays of airguns are popular seismic sources. To generate impulsive far-field signature, similar to those generated by dynamite, airguns in an airgun array of different size or character are arranged in certain geometric arrangements and are activated according to certain time sequence such that the generated wave fields are overlapped constructively or destructively to form impulsive source signature at the far field. The energy of the waves can be concentrated in a time and space during the wave propagation into the Earth. This can be environmentally damaging to the marine life in the surveying area and other sensitive marine structures. It is desirable to reduce the peak energy to reduce the environmental impact during seismic survey.

Instead of optimizing the airguns in an airgun array to form an impulsive source signature, (i.e. tuning the airgun array), there is a method called "popcorn" or "machine gun" firing. In this method, an individual airgun in an airgun array is fired at random (or pseudo random) times. Thus, the energy from the airgun array is distributed across a predefined time interval. The peak energy from the airgun array is much reduced.

There are a number of benefits to this type of acquisition, including reducing the peak output of an airgun array and reducing cross-talk between simultaneous seismic sources. However, whereas the tuned airgun array is designed to have the desired broadband spectral output, the distribution of the array in time is a significant de-tuning operation. The resulting output may be broadband in the sense that it spans the same frequency range, but by spreading the individual airgun signatures across time, a number of notches are introduced into the source spectrum. These notches are undesirable, as they will introduce side-lobes when the data are processed (for example, when the data are correlated with the source signature or during seismic migration). A number of solutions exist to remove these side-lobes. Where signal to noise levels are good, deconvolution of the distributed sequence can be attempted such that the signal in the notches can be recovered. In another approach, where the time distribution of the airgun array varies from location to location, a spatial reconstruction can be attempted, where the information from neighboring sources is used to reconstruct the information missing in the spectral notches. These methods impose limitations on the use of the distributed airgun.

For instance, it is unlikely that signal to noise levels will be high enough to satisfactorily deconvolve the distributed signature. In this case errors will be introduced into the deconvolved result (noise will be amplified), or if appropriately stabilized, this will introduce sidelobes (note that the extreme case of stabilizing the deconvolution is simply to cross-correlate the data).

Spatial reconstruction becomes difficult where the source sampling interval results in spatially aliased data. Typically, airgun sources will be fired every 25 m, allowing the seismic wavefield to be well sampled (spatially un-aliased) on the source side to a frequency of only 30 Hz (if a water velocity of 1500 m/s is assumed); thus, beyond this frequency spatial reconstruction of the notch frequencies becomes difficult. This is especially true for the reconstruction of missing frequencies at a given source location, as the gap between the two sources' either side is twice the shot interval. To have different time distribution for the airgun array from location to location, the airguns need to be activated according to different sequence from shot to shot.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter. In some embodiments, time-distributed airgun arrays may be used without, among other things, the limitations described above and/or modifications to existing acquisition hardware.

This disclosure relates to methods and apparatuses for using time-distributed firing sources and converting the acquired data to impulsive source data.

In one embodiment, the methods includes steps of having time-distributed data and the source signatures; selecting a range of frequencies; setting up basis functions with multiple frequencies within the range of frequencies; convolving the time-distributed source signature with the basis function to form basis for the acquired time-distributed data; inverting weighting factors from the acquired time-distributed data and basis for acquired time-distributed data; selecting an impulsive source signature; convolving the impulsive signature with the basis functions; and applying the weighting factors to form impulsive data.

The range of frequencies (a frequency window) may cover one or more notch frequencies, which may or may not be identified. Multiple ranges of frequencies may be used and some of them may overlap.

The methods may be used with simultaneous sources where the two sources are time-distributed firing sources. The two time-distributed firing sources may have same or different firing sequences. The source separation and impulsive data reconstruction may be done in the same process at the same time.

The methods may be performed in any domain including at least frequencies, for example, frequency domain, frequency-source space domain, frequency-wavenumber domain or frequency-slowness domain.

BRIEF DESCRIPTION OF DRAWINGS

Embodiments of this disclosure are described with reference to the following figures. The same numbers are used throughout the figures to reference like features and components. A better understanding of the methods or apparatuses can be had when the following detailed description of the several embodiments is considered in conjunction with the following drawings, in which.

DETAILED DESCRIPTION

Figure 1:
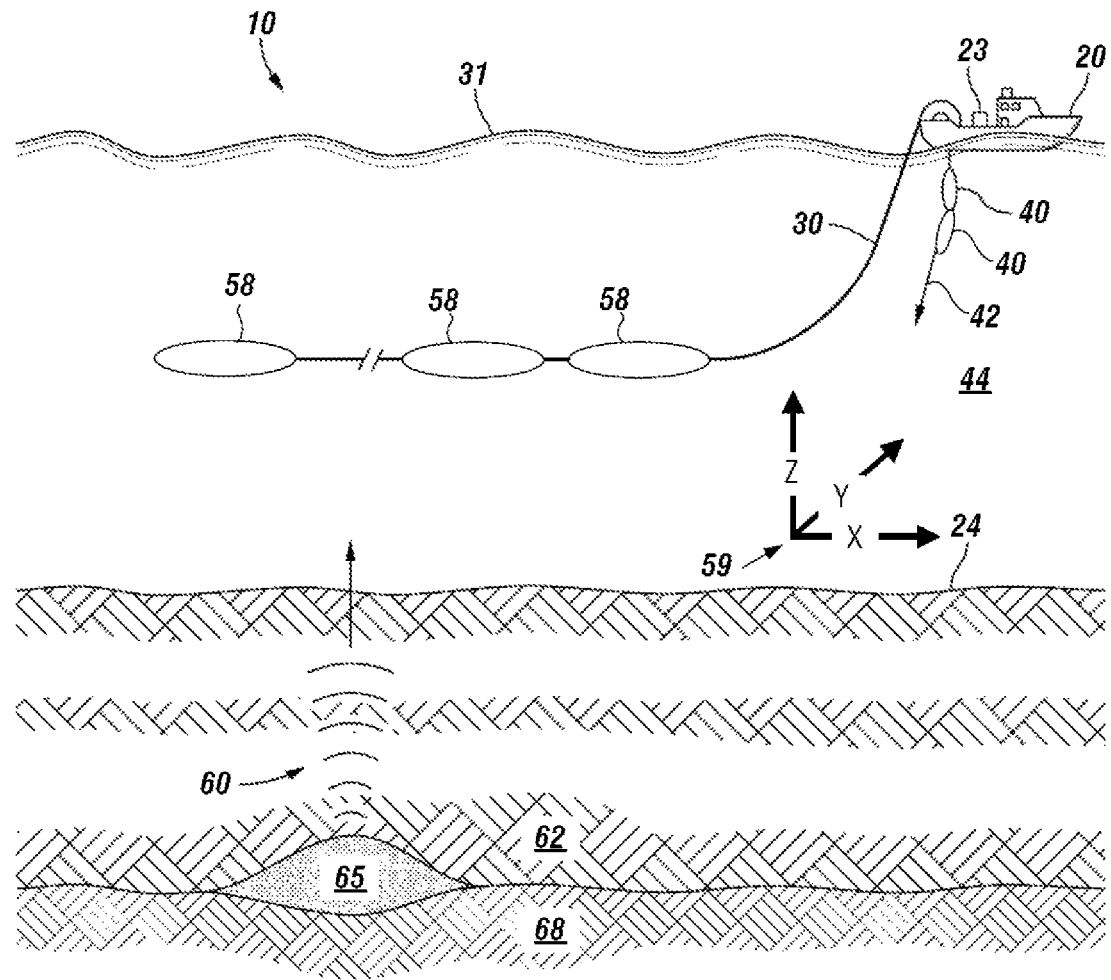
FIG. 1 illustrates a seismic acquisition system in a marine environment.

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well-known methods, procedures, components, and systems have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

FIG. 1 depicts an embodiment 10 of a marine-based seismic data acquisition system. In the system 10, a survey vessel 20 tows one or more seismic streamers 30 (one streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread.

The seismic streamers 30 may be several thousand meters long and may contain various support cables (not shown), as well as wiring and/or circuitry (not shown) that may be used to support communication along the streamers 30. In general, each streamer 30 includes a primary cable into which are mounted seismic sensors that record seismic signals. The streamers 30 contain seismic sensors 58, which may be hydrophones (to acquire pressure data) or multi-component sensors. For example, sensors 58 may be multi-component sensors; each sensor may be capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

The multi-component seismic sensor may include one or more hydrophones, geophones, particle displacement sensors, particle velocity sensors, accelerometers, pressure gradient sensors, or combinations thereof The marine seismic data acquisition system 10 includes one or more seismic sources 40 (two seismic sources 40 being depicted in FIG. 1), such as air guns and the like. The seismic sources 40 may be coupled to, or towed by, the survey vessel 20. The seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as a formation 65 that is depicted in FIG. 1.

The incident acoustic signals 42 that are generated by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection from the air-water boundary 31, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. It is noted that while the physical wavefield is continuous in space and time, traces are recorded at discrete points in space which may result in spatial aliasing. The traces are recorded and may be at least partially processed by a signal processing unit 23 that is deployed on the survey vessel 20, in accordance with some embodiments. For example, a particular seismic sensor 58 may provide a trace, which corresponds to a measure of a pressure wavefield by its hydrophone; and the sensor 58 may provide (depending the sensor configurations) one or more traces that correspond to one or more components of particle motion.

The goal of the seismic acquisition is to build up an image of a survey area for purposes of identifying subterranean geological formations, such as the geological formation 65. Subsequent analysis of the representation may reveal probable locations of hydrocarbon deposits in subterranean geological formations. Depending on the particular survey design, portions of the analysis of the representation may be performed on the seismic survey vessel 20, such as by the signal processing unit 23. In other surveys, the representation may be processed by a seismic data processing system (such as a seismic data processing system 600 in FIG. 6 and is further described below) that may be, for example, located on land or on the vessel 20.

A particular seismic source 40 may be formed from an array of seismic source elements (such as air guns, for example) that may be arranged in strings (gun strings, for example) of the array. A particular seismic source 40 may also be formed from one or a predetermined number of air guns of an array; it may also be formed from multiple arrays, etc. Regardless of the particular composition of the seismic sources, the sources may be fired in a particular time sequence during the survey.

The seismic sources 40 may be fired in a sequence such that multiple seismic sources 40 may be fired simultaneously or near-simultaneously in a short interval of time so that a composite energy signal that is sensed by the seismic sensors 58 contains a significant amount of energy from more than one seismic source 40. In other words, the seismic sources interfere with each other such that the composite energy signal is not easily separable into signals that are attributable to the specific sources. This type of seismic survey is referred to as simultaneous sources survey. The composite data that are acquired by the seismic sensors 58 may be separated, as described below, into datasets that are each associated with one of the seismic sources 40 so that each dataset indicates the component of the composite seismic energy signal that is attributable to the associated seismic source 40.

In a non-simultaneous sources survey, a delay is introduced between the firing of one seismic source and the firing of the next seismic source. The delay is sufficient to permit the energy that is created by the firing of one seismic source to decay to an acceptable level before the energy that is associated with the next seismic source firing arrives. The use of such delays, however, imposes constraints on the rate at which the seismic data may be acquired. For a towed marine survey, these delays also imply a minimum inline shot interval because the minimum speed of the survey vessel is a constraint.

Thus, the use of simultaneously-fired or near-simultaneously-fired seismic sources in which signals from the sources interfere for at least part of each record has benefits in terms of acquisition efficiency and inline source sampling. However, for this technique to be useful, the acquired seismic data must be separated into the datasets that are each uniquely associated with one of the seismic sources.

There are various ways to separate acquired composite data into datasets that are uniquely associated with one of the seismic sources, for example, as disclosed in a pending US patent application, Ser. No. 11/964,402, (402 application), filed on Dec. 26, 2007 by Ian Moore et al., titled "Separating seismic signals produced by interfering seismic sources"; US patent application, Ser. No. 12/256,135, filed on Oct. 22, 2008 by Ian Moore, titled "Removing seismic interference using simultaneous or near simultaneous source separation"; US patent application, Ser. No. 12/429,328, filed on Apr. 24, 2009 by Ian Moore et al., titled "Separating seismic signals produced by interfering seismic sources"; US patent application, Ser. No. 13/305,234, filed on Nov. 28, 2011 by Ying Ji et al., titled "Separation of simultaneous source data". All of the above patent applications are assigned to the same assignee as the current application. All of the above patent applications are hereby incorporated by reference.

Figure 2:
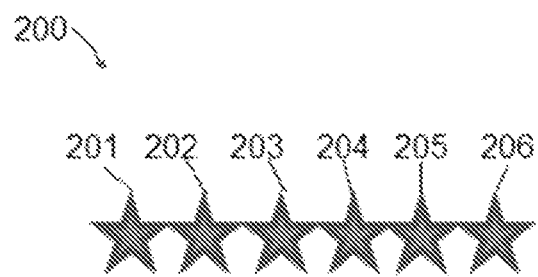
FIG. 2 illustrates a sketch of a six-gun array.
Figure 3A:
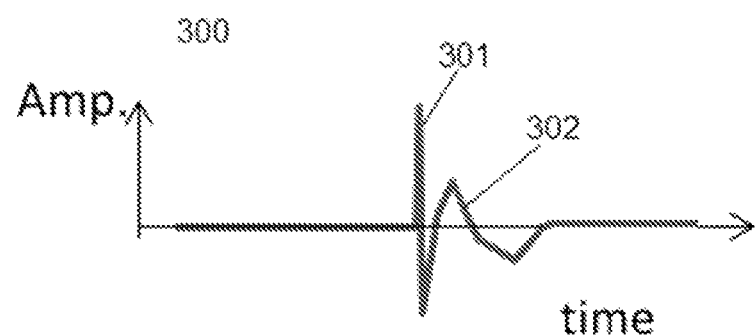
FIGS. 3a-3b illustrate the source signature of the array when the guns are tuned, in time-domain and in frequency domain, respectively.
Figure 3B:
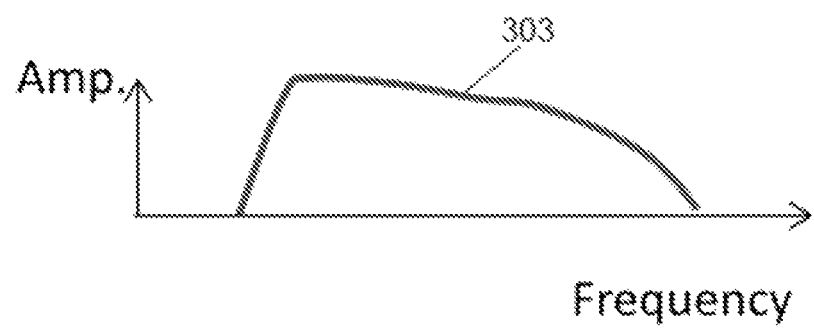

Regardless of whether sources are used in simultaneous data acquisition or non-simultaneous acquisition, the source elements (e.g. airguns) in a source array may be fired in a tuned manner to form an impulse, or in a time-distributed manner of which the source energy is spread over a larger time-interval. Using the example of six-gun array 200 as shown in FIG. 2, when the array is fired in a tuned manner, the tuned array signature may be an impulse, as shown in FIG. 3a. The impulse 300 has a large peak 301 for a short time interval and substantially smaller side lobes 302. The tuned array spectrum in frequency domain is as shown in FIG. 3b. The spectrum 303 covers a wide range with a smooth profile.

Figure 4A:
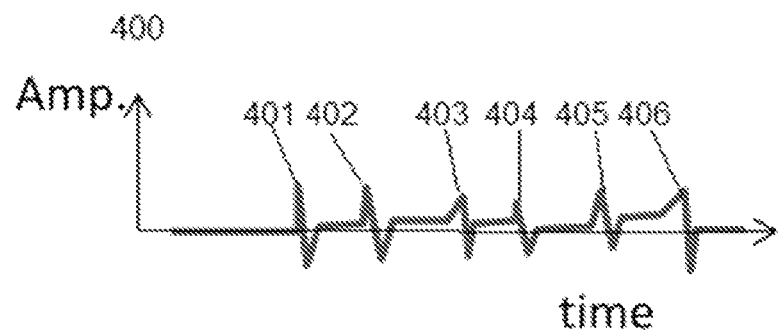
FIGS. 4a-4b illustrate the source signature of the array when the guns are fired as in the time-distributed airgun array, in time-domain and in frequency domain, respectively.
Figure 4B:
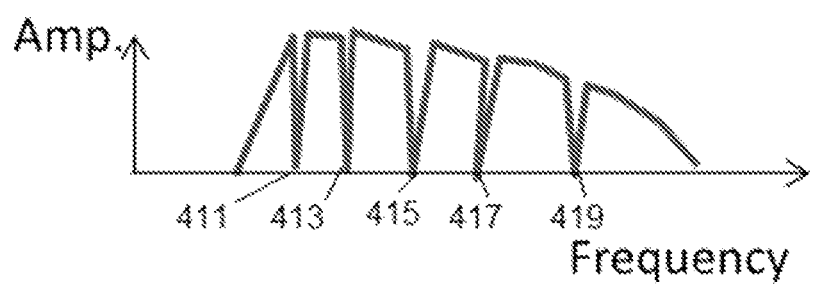

If the six-gun array 200 is fired in a time-distributed manner, the array signature 400 may become the time-distributed array signature as shown in FIG. 4a. The six guns (201, 202, 203, 204, 205 and 206) are fired at times spread across an interval. The total source energy is spread out in this larger time interval. The array signature 400 has six small peaks 401-406. Due to the spreading, a number of frequency notches 411, 413, 415, 417 and 419 are introduced into the source spectrum, as shown in FIG. 4b. These notches can cause problems when the data are further processed, for example, for imaging the subsurface structures. These notches need to be eliminated before the data are processed further.

The current application discloses methods and systems that can eliminate the notches in the frequency spectrum using a multi-frequency approach. Conventional seismic surveys are acquired with sources that are repeated from shot to shot. Some existing implementations of the time-distributed airgun array require that the time-distribution of the individual airgun is changed from shot to shot. The use of a multi-frequency approach can eliminate the need to vary the time-distributed sequence from shot to shot.

The multi-frequency data processing method was first introduced in a co-pending application, as cited above. Multiple frequencies around each notch (or each frequency of interest) are used, hence the name of "multi-frequency". In the description below, the method is directed to converting time-distributed data to equivalent impulsive data is first discussed. Then, similar methods may be used together with simultaneous sources.

The distributed array is spread across time, and because of the motion of the seismic source vessel, the energy from one distributed array is smeared across a small range of positions. For simplicity, this effect is ignored in the discussion below, but it should be understood that the method could be extended to include the exact locations of each individual airgun, allowing a de-smearing operation to be involved in the solution. Additionally for simplicity, a nominal shot location (herein referred to as the source location) is used. Since we are ignoring the smearing effect, we assume that all energy is emitted at this nominal location, and that the reconstructed impulsive data will correspond to an impulsive source at this location.

Acquiring Data Using a Time-distributed Source

During a seismic survey, when a time-distributed source is used, each source element in the source is activated during a small but sizeable time interval. Using the example as shown in FIG. 2, each airgun in the six-gun array is fired in a sequence at each source location during the survey, e.g., at 30, 40, 60, 70, 90, 100 ms during a 100 ms firing sequence. While this example is a regular firing sequence, a more random sequence of firing times may also be used. The activation sequence is spread out during the interval such that the energies from the source elements are spread out during the time interval. Unlike some prior art methods, the sequence of firing does not have to be changed or randomized from shot to shot, or location to location. The sequence can be the same at all source locations. Thus, airgun hardware can be used in a more conventional way. The receivers can record Earth responses as usual. The source signature can be recorded by reference receivers at a location near the source, i.e. recording near field source signature, or by reference receivers located at depth, i.e. recording far field source signature. Source signatures may also be modelled, or extracted from a pre-computed library of source signatures.

The acquired data from this survey in which the source is a time-distributed source is time-distributed data. This data may have fixed notches in the frequency domain within the seismic frequency range due to the regularity of the source element activation. These notches may cause problems in further data processing or utilization if not removed. As is discussed below, data with notches can be treated and converted into impulsive data without notches, a more desirable form of seismic data.

Reconstructing the Impulsive Data

The process of recording seismic data can be viewed as the convolution of the Earth's impulse response with the time-distributed sequence. In the frequency domain, it is a simple multiplication:

$$d_{ds}(f,x)=S_{ds}(f)r(f,x). \quad (1)$$

where $S_{ds}(f)$ is the signature of the distributed source sequence, $d_{ds}(f, x)$ is the acquired data due to the distributed source, and $r(f,x)$ is the impulse response. x is the source location, and f is the temporal frequency. For simplicity, the receiver is considered to be the same for each source.

The desired impulsive data can be defined as $$d_{is}(f,x)=S_{is}(f)r(f,x)., \quad (2)$$

where $S_{is}(f)$ is the desired impulsive source signature and $r(f,x)$ is the same impulse response of the Earth.

It is possible to define a set of basis functions, $b(p, \tau_0)$, that can describe the Earth's impulse response within a desired bandwidth, $$b(p, \tau_0) = \begin{pmatrix} b(p, \tau_0, f_L, x_M) \\ \vdots \\ b(p, \tau_0, f_L, x_{-M}) \\ \vdots \\ b(p, \tau_0, 0, x_M) \\ \vdots \\ b(p, \tau_0, 0, x_{-M}) \\ \vdots \\ b(p, \tau_0, f_{-L}, x_M) \\ \vdots \\ b(p, \tau_0, f_{-L}, x_{-M}) \end{pmatrix} \quad (3)$$

Figure 5:
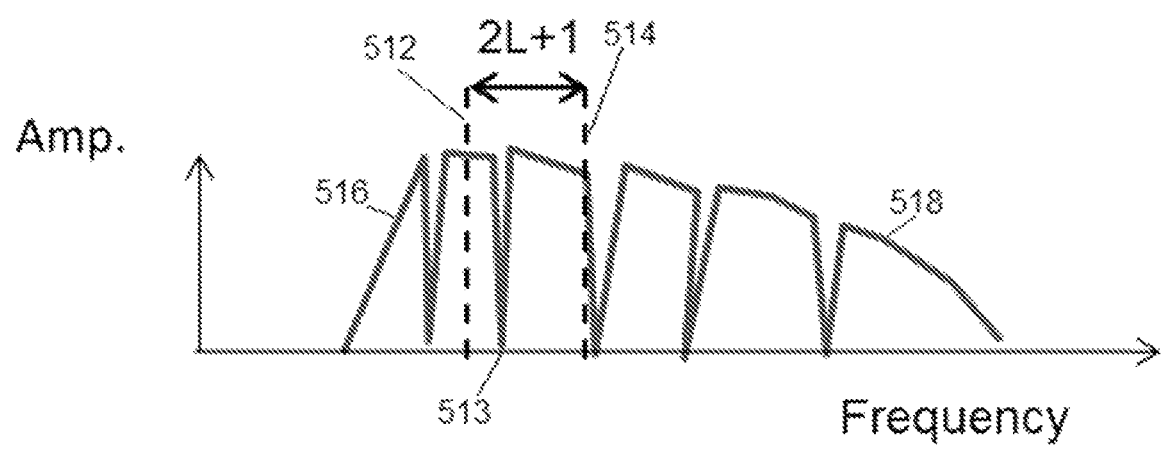
FIG. 5 illustrates the spectrum of the source signature as in FIG. 4b where the spectrum notches are repaired using multiple frequencies around the notches.

Each basis function may correspond to a linear-dipping event, defined by an intercept time $\tau_0$ and a slowness p. Any other type of basis function can be used, for example, a hyperbolic basis, a parabolic basis, or any combination of linear, hyperbolic and parabolic. Each element $b(p, \tau_0, f_l, x_m)$ corresponds to a single slowness (p), a single intercept ($\tau_0$), a single frequency $f_l$, and a single spatial position $x_m$. Therefore, each basis function $b(p, \tau_0)$ corresponds to a range of 2L+1 frequencies and 2M+1 spatial locations (the nominal source locations). The inclusion of the 2L+1 frequencies makes this a multi-frequency approach. When a central frequency $f_0$ is selected to be one of the many notch frequencies, the basis functions can describe the notch frequency and the frequencies around the notch. For ease of discussion and computation, the number of temporal frequencies and spatial locations are selected to be odd numbers, and around the central frequency and location they are selected to be even numbers, but they do not have to be. For example, as shown in FIG. 5, for notch frequency 513, a range of 2L+1 frequencies between 512 and 514 are selected. The notch frequency 513 is not located at the center of the range.

In some cases, the exact locations of notch frequencies are not determined explicitly. It may not be necessary to determine such locations, just that the notches exist in the signature $S_{ds}(f)$ and need to be removed. In some cases, the possible frequency ranges where the notches exist are known or can be easily determined, e.g. frequency range 516-518 as shown in FIG. 5. A window of 2L+1 frequencies, e.g. between 512 and 514 may be selected. Several more frequency windows are selected and moved through the frequency range of 516-518. In each window, data is processed and possible notches within the window are eliminated. Once all windows are processed, all possible notches are automatically covered without identifying the actual locations of the notches. To reduce edge effects, the adjacent frequency windows may have overlapping frequencies, in some cases there may be only 1 non-overlapping frequency. Where frequencies overlap, the non-overlapping frequencies can be stored as the output frequencies, or overlapping frequencies can be merged (e.g., the average output at each frequency can be used). The processing for each frequency window is the same and only one is discussed below.

These basis can be used to describe the impulse response by finding an appropriate weighting factor, $m(p, \tau_0)$, for each basis, i.e., $$r = Bm, \quad (4).$$

where B is the matrix containing the complete set of basis functions for all required $\tau_0$ and p, and m is the corresponding set of weighting factors. The required values for $\tau_0$ and p can be determined by examining the data in a suitable data domain, e.g., the intercept-slowness domain.

If the set of basis functions is suitable to describe the Earth's impulse response, then the set of basis functions convolved with the distributed array's source signature is suitable to describe the data, $d_{ds}$, in Eq. (1). Thus, we define a set of basis for the data:

$$g_{ds}(p, \tau_0) = \begin{pmatrix} S_{ds}(f_L)b(p, \tau_0, f_L, x_M) \\ \vdots \\ S_{ds}(f_L)b(p, \tau_0, f_L, x_{-M}) \\ \vdots \\ S_{ds}(0)b(p, \tau_0, 0, x_M) \\ \vdots \\ S_{ds}(0)b(p, \tau_0, 0, x_{-M}) \\ \vdots \\ S_{ds}(f_{-L})b(p, \tau_0, f_{-L}, x_M) \\ \vdots \\ S_{ds}(f_{-L})b(p, \tau_0, f_{-L}, x_{-M}) \end{pmatrix} \quad (5)$$

In the same way as Eq. (4), the basis in Eq. (5) can be used to describe the data, $$d_{ds} = G_{ds}m. \quad (6)$$

In Eq. (6), the left side of the equation, i.e., the data $d_{ds}$, is acquired from the seismic survey, and it is known. The matrix of basis functions for the data, $G_{ds}$, is also known, because it is the combination of the known distributed source signatures $S_{ds}(f)$ and the known basis functions $b(p, \tau_0)$ (as discussed above related to Eq. (3)). The only unknown variables in Eq. (6) are the weighting factors m. To determine the weighting factors, we may use an inversion method to solve for m from the defined basis $G_{ds}$ and the data itself $d_{ds}$. This could be achieved by using, for example, methods such as LSQR, matching pursuit, iteratively re-weighted least squares, or any other inversion approach. This may include L2 methods, L1 methods, or a combination of both.

Having solved for m in Eq. (6), we can safely assume that this m also corresponds to the m, in Eq. (4). m are the weighting factors dependent on the survey geometry and not dependent on the source signatures. Thus, by using a different source signature, one can obtain a different data that corresponds to such source signature. If an impulsive source signature is used, then the data is a data corresponding to such an impulsive source.

Similar to the source signature in Eq. (5), data from an impulsive source can be represented by:

$$g_{is}(p, \tau_0) = \begin{pmatrix} S_{is}(f_L)b(p, \tau_0, f_L, x_M) \\ \vdots \\ S_{is}(f_L)b(p, \tau_0, f_L, x_{-M}) \\ \vdots \\ S_{is}(0)b(p, \tau_0, 0, x_M) \\ \vdots \\ S_{is}(0)b(p, \tau_0, 0, x_{-M}) \\ \vdots \\ S_{is}(f_{-L})b(p, \tau_0, f_{-L}, x_M) \\ \vdots \\ S_{is}(f_{-L})b(p, \tau_0, f_{-L}, x_{-M}) \end{pmatrix} \quad (7)$$

where $S_{is}$ is source signature of a desired impulsive source. The basis functions $b(p, \tau_0)$ are the same as the ones in Eq. (5), which describe the same Earth structures under investigation.

This set of basis is for the desired impulsive data; i.e., the sources are at the desired locations with desired frequency spectra. Unlike physical airgun array sources, there are no physical limitations on the source hardware or software. They can be any source signature that will be beneficial.

Once the desired basis (Eq. 7) is selected, the desired impulsive data can then simply be modeled using the solution from Eq. 6, $$d_{is}=G_{is}m. \tag{8}$$

Thus, the frequency diverse approach can be used to reconstruct impulsive data from the notched distributed airgun data, by using multiple frequencies to solve for the data in the notches.

Figure 6:
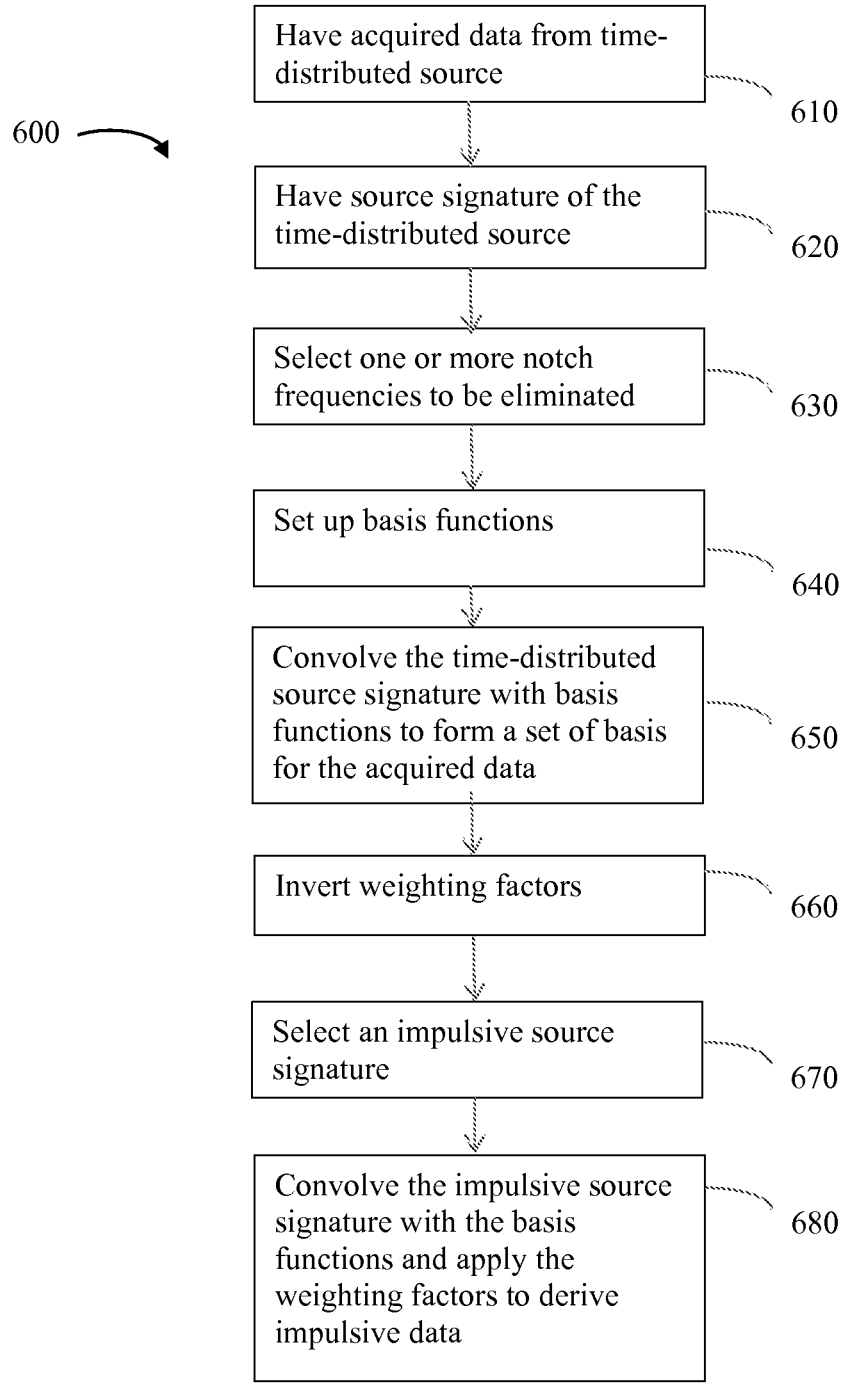
FIG. 6 illustrates a flow diagram of a method using multi-frequency processing.

In summary, a method 600 to convert time-distributed data to impulsive data using multiple frequencies as shown in FIG. 6 may include the following steps:

Step 610, have the acquired data from time-distributed sources, transformed into frequency domain if necessary;

Step 620, have the source signature of the time-distributed sources;

Step 630, select one or more notch frequencies in the frequency domain to be eliminated; or alternatively, select a frequency window where notches within the window will be eliminated;

Step 640, set up basis functions that describe the Earth impulse response within a desired window including those one or more notches. Each notch frequency or a frequency within the window may be selected as a reference frequency, and a few more frequencies around the reference frequency are selected in the basis functions;

Step 650, convolve the time-distributed source signature with the basis functions to form a set of basis for the acquired data; the time-distributed source signature is the signature of the sources that are used to acquire the data;

Step 660, from the acquired data and its basis, invert for the weighting factors;

Step 670, select an impulsive source signature that corresponds to a desired impulsive source; and Step 680, convolve the impulsive source signature with the basis functions and apply the weighting factors to derive data corresponding to the impulsive source signature.

It is noted that the steps listed above are listed in a sequence of convenience; it is not necessary that they are performed in that order. For example, the time-distributed source signature or the impulsive source signature may be determined or selected before the beginning of the converting process. The basis function may also be selected or determined before the beginning of the converting process. As discussed in reference to Eq. (6), the inverting step can be performed using any methods mentioned above.

In many seismic data processing techniques, it is normal for the data to be processed in small, overlapping time windows, and it should be understood that the above can be applied to time windowed or non-time windowed data.

The impulsive source signature is the desired impulsive source signature. It can be selected or designed to be anything desired. The distributed source signature is the signature of the source that is used to acquire the time-distributed data. Such signature can be obtained from many known methods, e.g. from a modelled or measured source signature library. The signature may also be measured directly at far field, or measured at near field and extrapolated to the far field. The basis function for Earth impulsive response may be derived from a background model of the Earth under investigation which can be a simple model or a more elaborated model in which the events can be linear, hyperbolic, parabolic, or a combination.

In a usual seismic survey, the full seismic spectrum is about 1 Hz up to about 120 or 150 Hz. The multiple frequency range used in the methods described above may be about 10 Hz or even as wide as 20 Hz. Thus, if the notch frequency is found to be at 60 Hz, for example, the multiple frequency range may be selected to be 55 Hz to 65 Hz. The notch frequency elimination can be done one at a time or several identified notch frequencies at one time, depending on considerations of other operation parameters. In some cases where a frequency window is selected, the exact notch frequencies within the window may not be known or determined. The method described above ensures that the notch frequencies within the window, if any, are eliminated. The frequency window can be as small as a few Hz or as large as a substantial section of the entire seismic frequency range, depending on considerations of other operation parameters.

Separating and Reconstructing Time Dithered Time Distributed Data

The above methods may also be used together with two or more simultaneous sources. For simplicity, two simultaneous sources are considered in the discussion below, but extension to more than two sources is not complicated. The sources may be activated via any simultaneous source scheme. For simplicity of discussion, a time-dithering method for simultaneous source is used here. Each acquired data corresponds to a different distributed airgun array (say, $S_{ds}^1$ and $S_{ds}^2$, where each array uses a different firing sequence). One of these sources is randomized with respect to the other by using a time dither that varies from shot to shot, $\Delta T(x)$. The simultaneous source data can be represented by:

$$d_{ds}(f,x)=S_{ds}^1(f,0)r_1(f,x_1)+S_{ds}^2(f,\Delta T(x_2))r_2(f,x_2), \tag{9}$$

where the additional argument in the distributed sequence indicates the time dithers, and the subscript indicates to which source a quantity refers. $r_1$ and $r_2$ correspond to the Earth response for source 1 and source 2, respectively.

As in Eq. (5), we use a set of basis functions to define the data in Eq. (9). In this case, two sets of basis functions are required, one of which contains the time dithers corresponding to the second source. This means that the basis function library can completely describe the time dithered, time-distributed airgun data in Eq. (9). The basis functions are defined as, $$g_{ds}^1(p,\tau_0) = \begin{pmatrix} S_{ds}^1(f_L,0)b(p,\tau_0,f_L,x_M) \\ \vdots \\ S_{ds}^1(f_L,0)b(p,\tau_0,f_L,x_{-M}) \\ \vdots \\ S_{ds}^1(0,0)b(p,\tau_0,0,x_M) \\ \vdots \\ S_{ds}^1(0,0)b(p,\tau_0,0,x_{-M}) \\ \vdots \\ S_{ds}^1(f_{-L},0)b(p,\tau_0,f_{-L},x_M) \\ \vdots \\ S_{ds}^1(f_{-L},0)b(p,\tau_0,f_{-L},x_{-M}) \end{pmatrix}, \tag{10}$$

and $$g_{ds}^2(p, \tau_0) = \begin{pmatrix} S_{ds}^2(f_L, \Delta T(x_M))b(p, \tau_0, f_L, x_M) \\ \vdots \\ S_{ds}^2(f_L, \Delta T(x_{-M}))b(p, \tau_0, f_L, x_{-M}) \\ \vdots \\ S_{ds}^2(0, \Delta T(x_M))b(p, \tau_0, 0, x_M) \\ \vdots \\ S_{ds}^2(0, \Delta T(x_{-M}))b(p, \tau_0, 0, x_{-M}) \\ \vdots \\ S_{ds}^2(f_{-L}, \Delta T(x_M))b(p, \tau_0, f_{-L}, x_M) \\ \vdots \\ S_{ds}^2(f_{-L}, \Delta T(x_{-M}))b(p, \tau_0, f_{-L}, x_{-M}) \end{pmatrix} \quad (11)$$

Similar to Eq. (6), the data in Eq. (9) can then be described as $$d_{ds} = G_{ds} m. \quad (12)$$

Here, $G_{ds}$ is now the matrix containing the complete set of basis functions (Eq. 11 and Eq. 12) defining both sources, ordered with all basis functions for the first source first, followed by all basis for the second source. Thus, the weighting functions m that allow the basis functions to describe the data can be found by inverting Eq. (12) in the same way that Eq. (6) would be inverted. Once found, the model parameters that correspond to each source can be defined as $$m = \begin{pmatrix} m_1 \\ m_2 \end{pmatrix}. \quad (13)$$

Two sets of basis to describe the separated impulsive data are defined as:

$$g_{is}^{1,2}(p, \tau_0) = \begin{pmatrix} S_{is}^{1,2}(f_L)b(p, \tau_0, f_L, x_M) \\ \vdots \\ S_{is}^{1,2}(f_L)b(p, \tau_0, f_L, x_{-M}) \\ \vdots \\ S_{is}^{1,2}(0)b(p, \tau_0, 0, x_M) \\ \vdots \\ S_{is}^{1,2}(0)b(p, \tau_0, 0, x_{-M}) \\ \vdots \\ S_{is}^{1,2}(f_{-L})b(p, \tau_0, f_{-L}, x_M) \\ \vdots \\ S_{is}^{1,2}(f_{-L})b(p, \tau_0, f_{-L}, x_{-M}) \end{pmatrix} \quad (14)$$

and, finally, using the defined $G_{is}^1$ and $G_{is}^2$ (containing all $g_{is}^{1,2}$) and solved $m_1$ and $m_2$, the separated datasets converted to their impulsive equivalents can be modeled as, $$d_{is}^1 = G_{is}^1 m_1, \quad (15)$$

and $$d_{is}^2 = G_{is}^2 m_2, \quad (16)$$

where $d_{is}^1$ and $d_{is}^2$ are the two separated datasets.

Thus, the simultaneous time dithered time-distributed data can be separated and converted to its impulsive source equivalent by using a multi-frequency separation and reconstruction approach.

It is noted that if different time-distributed sequences are used for different simultaneous sources, their corresponding data sets may be recovered with the time-distributed sequences. The different time-distributed sequences can be the "coding" for the different simultaneous sources and removes the need for time dithering or another source coding scheme.

Figure 7:
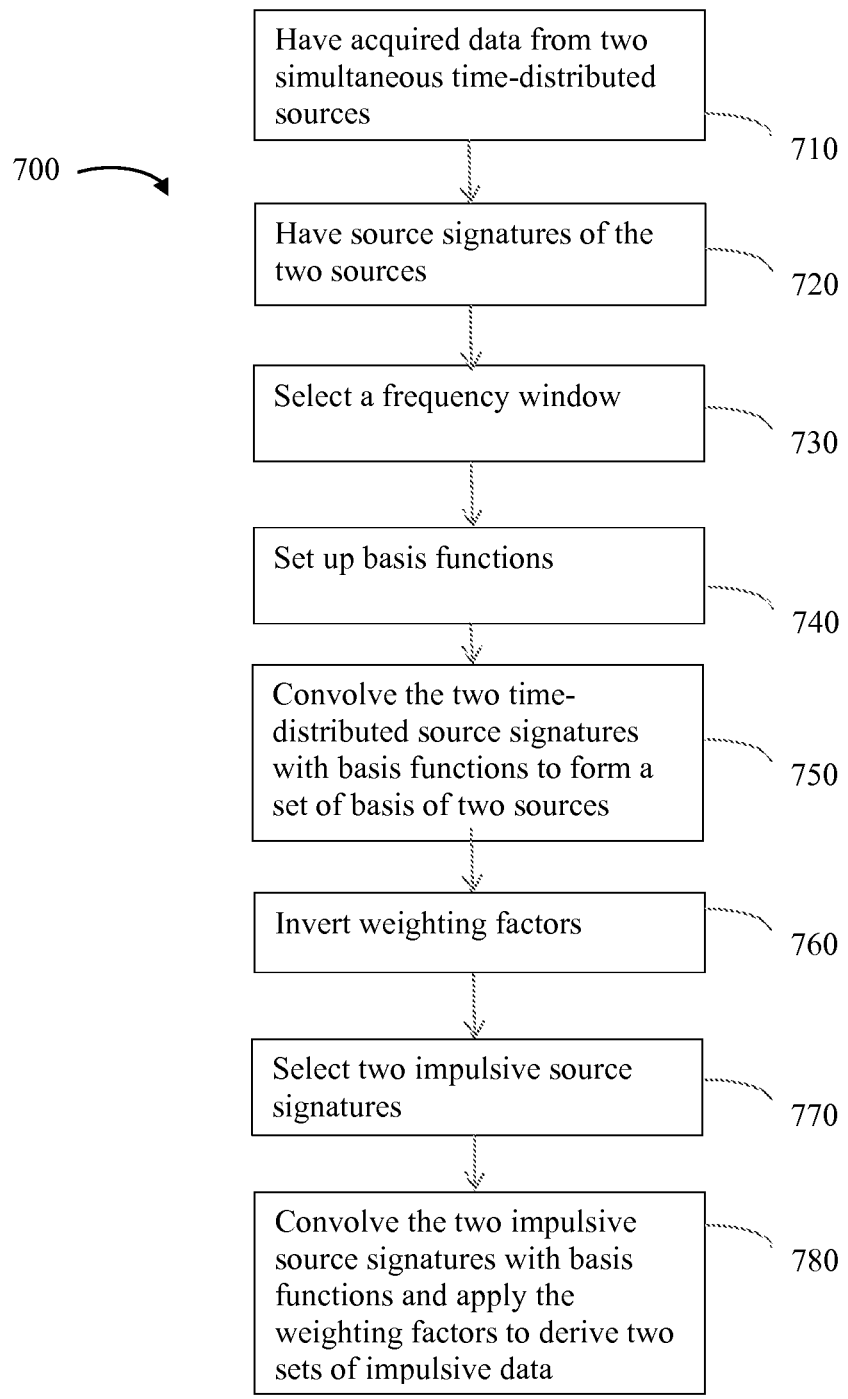
FIG. 7 illustrates a flow diagram of a method using multi-frequency processing together with simultaneous sources.

The data separation due to simultaneous sources and impulsive data reconstruction due to time-distributed sources may be performed all at once. A method 700, similar to the method 600, is illustrated in FIG. 7.

Step 710, have the acquired data from two simultaneous time-distributed sources, transformed into frequency domain if necessary;

Step 720, have the source signatures of the two time-distributed sources.

Step 730, select a frequency window. There may be many overlapping frequency windows that can cover the entire seismic frequency range when combined. The frequency window may be wide enough to cover a notch and its surrounding frequencies, or narrow enough such that the data within the window are frequency independent.

Step 740, set up basis functions that describe the Earth impulse response within a desired bandwidth including those one or more notches. Each notch frequency may be selected as a reference frequency, and a few more frequencies around the reference frequency are selected in the basis functions;

Step 750, convolve the two time-distributed source signatures with the basis functions to form a set of basis for the acquired data; the time-distributed source signatures are the signatures of the sources that are used to acquire the data.

Step 760, invert the weighting factors from the acquired data and its basis. The inversion may be written as in Eq. (12), in which the two resulting weighting factors are written as one m as in Eq. (14). They may also be written separately, as $m_1$ and $m_2$, respectively.

Step 770, select two impulsive source signatures that correspond to two desired impulsive sources, as expressed in Eq. (14); and Step 780, convolve each impulsive source signature with the respective basis functions and apply the weighting factors to derive data corresponding to each impulsive source signature, as in Eq. (15) and (16).

It is noted that when two simultaneous sources are used, there are two sources. Consequently, the source related items are doubled, i.e. there are two sets of source signatures, two sets of basis and two sets of data. The size of the basis is doubled. Otherwise, the method 700 is almost the same as method 600.

When multiple overlapping frequency windows are used, the method 700 is repeated for each frequency window until all frequency windows are processed.

As can be seen above, the way simultaneous source coding is done does not affect the use of any of the above equations. In the above example, when source dithering is used, the dithering time $\Delta T$ only appears in the basis function of Eq. (11). Therefore, whether the simultaneous source coding is done by time dithering or any other method does not affect the method.

The multi-frequency approach is insensitive to spatial sampling, so data with some spatial aliasing may not be a concern. These methods can work with aliased data as well as non-aliased data.

As in the single source case, it should be understood that the above simultaneous source separation method can be applied to both time windowed or non-time windowed data.

In the above discussion, the source locations used are nominal shot points, which are not the exact shot locations. Using nominal shot locations instead of actual shot locations may introduce smearing effects. To avoid such smearing, the actual shot locations may be used. More specifically, in the basis functions of Eq. (5), the exact point in space where the individual airgun is fired may be used for source signature. The position difference of actual source positions among sources is the distance that the source has traveled, which is a product of time interval between the firing and the source speed. Above, the method was described using the signature of the distributed source sequence, $S_{ds}(f)$. This signature is formed of the individual signatures of each airgun forming the airgun array. When it is assumed that the source is stationary, this composite signature can be formed by simply summing the individual signatures, time delayed according to the distributed time sequence. However, if source motion is to be considered, it is necessary to form basis functions for each individual airgun within the array, including the time delay and the associated distance travelled by the source. The sum of each of these individual basis function can then be used to represent the data incorporating the motion of the source. For example, a single basis in Eq. 5 may be replaced with, $$\Sigma_i S_i(f_L) b(p, \tau_0, f_L, x_M + \Delta x_i) \qquad (17)$$

where $S_i(f_L)$ is the signature of the ith airgun of the source array, and $\Delta x_i$ is the change in position of the individual airgun, relative to the nominal shot position, $x_M$. Note that while Eq. (5) can be modified to describe the motion of the source in this way, the desired impulsive data does not include source motion, and hence the additional step in Eq. 17 would not be applied to Eq. 7.

The smearing can have a significant impact on the directionality of the seismic source, especially for large take-off angles such as those of interest in a wide azimuth marine seismic survey. Such an approach could be valuable when considering the quality of time-distributed array data versus conventional data.

The methods discussed above use time-distributed firing sources rather than "tuned" airgun arrays which generate "impulsive" source signature. These methods overcome many limitations of existing time-distributed airgun arrays. The methods use information from multiple frequencies to reconstruct the frequencies lost in the notches. This takes advantage of the fact that seismic data varies slowly across a small frequency range; hence the information from frequencies above and below the notches can be used to constrain the solution within the notch.

Compared to the conventional deconvolution approach, these methods are less sensitive to noise, as the high signal-to-noise regions outside the notch stabilize the solution in the low signal-to-noise region within the notch. Compared to the spatial reconstruction approach, these methods are not as sensitive to spatial sampling (using frequency samples from either side of the notch, rather than, or in addition to, spatial samples from either side of the notch). Neither are these methods dependent on the distributed airgun array changing randomly (or in a prescribed manner) from location to location.

These methods using multiple frequencies can be implemented in a 2D fashion, in which both multiple frequencies and multiple source locations are used as input. In this case, there will also be benefits to using randomly changing distributed arrays.

It is noted that temporally distributed arrays have advantages in their application to simultaneous source separation as discussed above. The multiple distributed arrays can be configured such that source cross-talk is minimized in whatever separation scheme is considered. This may be done by optimizing certain properties of the distributed arrays, for example the auto-correlation and cross-correlation properties of the distributed array source signatures. These methods can be applied after the distributed array data have been separated. It is also possible that source separation and data reconstruction can be performed all at once.

The methods discussed above use multiple traces at a time. For each group of traces in frequency domain, multiple frequencies are selected around one or more notch frequencies. Once the group of traces is processed, the next group of traces is processed (there may be an overlap between each group). If the data are well sampled (i.e., if there is no spatial aliasing), the same multiple frequency approach may be used with only a single trace at a time or in some different domains.

Figure 8:
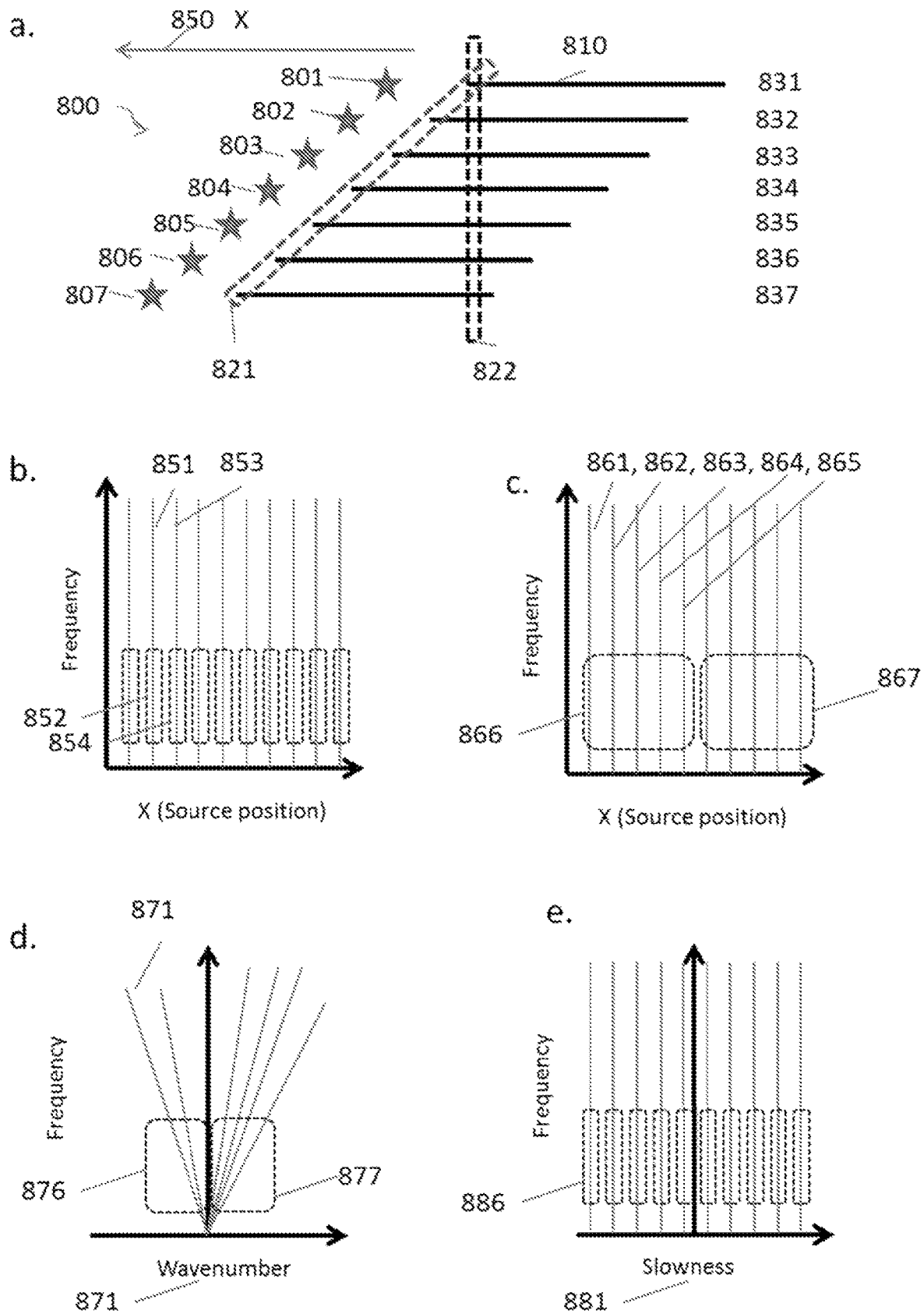
FIGS. 8a-8e illustrate a few additional variations of the methods.

FIGS. 8a-8e illustrate some examples. FIG. 8a shows a simple towed streamer shooting configuration 800. The star (e.g. 801-807) indicates the airgun source array, and the black solid line 810 indicates the streamer spread. Each part of the sketch (831-837) indicates a different shot time. As the shots are fired, the vessel (not shown) moves up along with the streamer spread 810 in the X-direction 850. Instead of processing the data one trace at a time, multiple traces may be processed together. To apply the method to multiple shots at the same time, as described above, the data may be sorted into gathers that contain the records from multiple shots. One option is indicated by the dashed box 822 in FIG. 8a. In this case, the recording from the part of the streamer that lies in this box 822 is selected for each shot, i.e., one record is chosen for each shot. These records form a common-receiver gather. Alternatively, rather than using a fixed spatial position, a fixed position on the streamer can be used. This is indicated by the box 821, from which now the first part of the streamer is selected for each shot. This is a common offset (or common channel) gather. The entire dataset can be sorted in this way, such that multiple shot records are grouped together.

Grouping the shots in this manner offers different options when using multi-frequency methods. FIG. 8b shows the data from multiple shots (indicated by Source position, X, e.g. 851, 853) after the transformation to the frequency domain. In FIG. 8b, the thin blue lines (e.g. 851 or 853) indicate one shot record. For a given frequency range (e.g. 852 or 854, indicated by the dashed black line), each source can be processed independently using the multi-frequency method. Independent processing of the traces may allow for more efficient computation of the impulsive source data, and may be most effective in the case in which the effect of spatial aliasing is limited. Alternatively, as shown in FIG. 8c, a small group of shots (e.g. 861-865) can be processed simultaneously as a group 866, as indicated by the dashed black boxes. Other traces in FIG. 8c may be grouped together as 867. Although FIG. 8c shows that group 866 and 867 are separate and have different traces, these groups may overlap. Data from multiple source locations may be grouped together such that the signal is spatially coherent across the group of traces. For example, when using linear basis functions, it is desirable for the data to be composed of only linear events. This may be the case if only a small number of traces are considered at one time. Data from multiple source locations may be grouped together such that the signal is spatially coherent across the group of traces. For example, when using linear basis functions, it is desirable for the data to be composed of only linear events. This may be the case if only a small number of traces are considered at one time.

While the examples in FIGS. 8*b* and 8*c* are different, they both are still processed in frequency and source position domain. An alternative when the data are spatially well sampled is to transform the source positions to wavenumbers, where a wavenumber transform involves combining the data from multiple positions. FIG. 8*d* illustrates a frequency-wavenumber domain, where the lines (e.g. 871) indicate individual data events in the frequency-wavenumber domain. The basis functions discussed above that are in the frequency-source position domain can be modified to operate in this frequency-wavenumber domain. The wavenumber domain can be further transformed to the slowness domain. In the slowness domain, it is possible to process the data along individual "slowness traces", thus focusing the dashed boxes 886 back on single traces. Note that when working on a single trace, or a single slowness trace, a method such as IMAP (interpolation by matching pursuit, originally configured to reconstruct spatial samples) could likewise be used to reconstruct the missing information in the notches by considering multiple frequencies.

Once the data are processed using the method, the data can be transformed from slowness/wavenumber domain back to source position domain.

As those with skill in the art will understand, one or more of the steps of methods discussed above may be combined and/or the order of some operations may be changed. Further, some operations in methods may be combined with aspects of other example embodiments disclosed herein, and/or the order of some operations may be changed. The process of measurement, its interpretation, and actions taken by operators may be done in an iterative fashion; this concept is applicable to the methods discussed herein. Finally, portions of methods may be performed by any suitable techniques, including on an automated or semi-automated basis on computing system 900 in FIG. 9.

Figure 9:
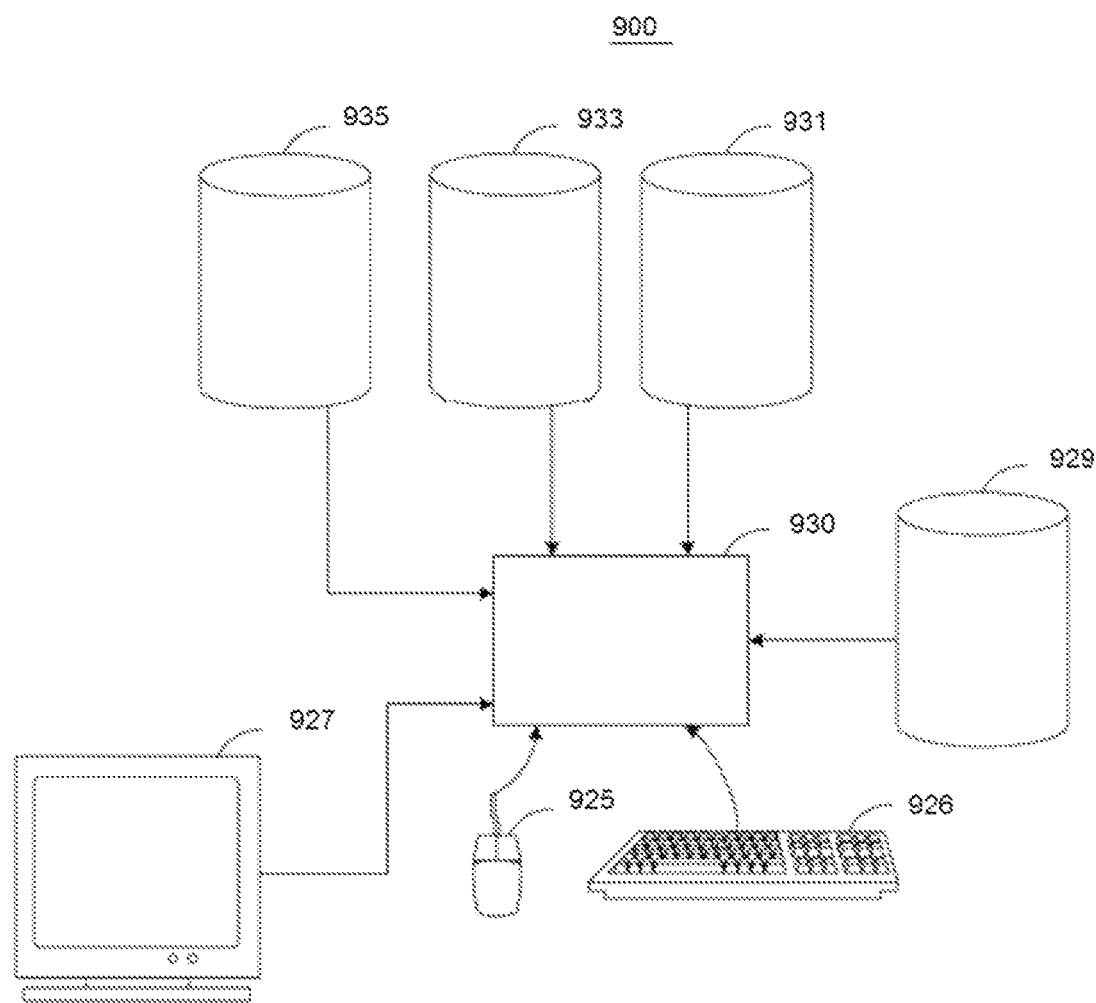
FIG. 9 illustrates a schematic view of a computer system with which some methods disclosed can be implemented.

Portions of methods described above may be implemented in a computer system 900, one of which is shown in FIG. 9. The system computer 930 may be in communication with disk storage devices 929, 931, 933 and 935, which may be external hard disk storage devices and measurement sensors (not shown). It is contemplated that disk storage devices 929, 931, 933 and 935 are conventional hard disk drives, and as such, may be implemented by way of a local area network or by remote access. While disk storage devices are illustrated as separate devices, a single disk storage device may be used to store any and all of the program instructions, measurement data, and results as desired.

In one implementation, real-time data from the sensors may be stored in disk storage device 931. Various non-real-time data from different sources may be stored in disk storage device 933. The system computer 930 may retrieve the appropriate data from the disk storage devices 931 or 933 to process data according to program instructions that correspond to implementations of various techniques described herein. The program instructions may be written in a computer programming language, such as C++, Java and the like. The program instructions may be stored in a computer-readable medium, such as program disk storage device 935. Such computer-readable media may include computer storage media. Computer storage media may include volatile and non-volatile media, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 930. Combinations of any of the above may also be included within the scope of computer readable media.

In one implementation, the system computer 930 may present output primarily onto graphics display 927, or via printer 928 (not shown). The system computer 930 may store the results of the methods described above on disk storage 929, for later use and further analysis. The keyboard 926 and the pointing device (e.g., a mouse, trackball, or the like) 925 may be provided with the system computer 930 to enable interactive operation.

The system computer 930 may be located on-site, e.g. as part of processing unit 23 on-board a vessel 20 as in FIG. 1 or at a data center remote from the field. The system computer 930 may be in communication with equipment on site to receive data of various measurements. Such data, after conventional formatting and other initial processing, may be stored by the system computer 930 as digital data in the disk storage 931 or 933 for subsequent retrieval and processing in the manner described above. While FIG. 9 illustrates the disk storage, e.g. 931 as directly connected to the system computer 930, it is also contemplated that the disk storage device may be accessible through a local area network or by remote access. Furthermore, while disk storage devices 929, 931 are illustrated as separate devices for storing input data and analysis results, the disk storage devices 929, 931 may be implemented within a single disk drive (either together with or separately from program disk storage device 933), or in any other conventional manner as will be fully understood by one of skill in the art having reference to this specification.

Although only a few example embodiments have been described in detail above, those skilled in the art will readily appreciate that many modifications are possible in the example embodiments without materially departing from this invention. Accordingly, all such 7modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for seismic surveying, the method comprising:
using first and second time-distributed firing source arrays that each include a plurality of source elements to acquire time-distributed seismic data in a seismic survey that includes data from the first and second time-distributed seismic firing sources when activated simultaneously;

determining a time-distributed source signature that includes signatures of the first time-distributed firing source array and of the second time-distributed firing source array;

selecting a window of frequencies in the time-distributed source signature;

defining basis functions with multiple frequencies within the window of frequencies;

convolving the time-distributed source signature with the basis functions to form a basis for the acquired time-distributed seismic data;

obtaining weighting factors by using an inversion method that solves for the weighting factors from the acquired time-distributed seismic data and the basis for the acquired time-distributed seismic data;

selecting an impulsive source signature that includes source signatures of two impulsive sources;

convolving the impulsive signature with the basis functions and applying the weighting factors to form impulsive seismic data from the acquired time-distributed seismic data, which includes convolving the source signatures of the two impulsive sources with the basis functions and applying the weighting factors to form two sets of impulsive data from the time-distributed seismic data; and processing the formed impulsive seismic data to determine properties of an interior section of the Earth.

2. The method of claim 1, wherein firing sequences of the plurality of source elements in the time-distributed firing source array is the same from source location to source location.

3. The method of claim 1, wherein selecting the window of frequencies in the time-distributed source signature comprises selecting multiple windows of frequencies in the time-distributed source signature, and wherein at least two of the multiple windows overlap.

4. The method of claim 1, wherein using the time-distributed firing source array to acquire time-distributed seismic data comprises firing the time-distributed firing source array in the seismic survey and using a plurality of receivers to acquire the time-distributed seismic data.

5. The method of claim 4, wherein the time-distributed source signature is acquired from a near-field receiver, a far-field receiver or synthetic source signatures.

6. The method of claim 4, wherein a firing sequence of the plurality of source elements in the time-distributed firing source array is the same from source location to source location.

7. The method of claim 1, wherein the basis function has a form of:

$$b(p, \tau_0) = \begin{matrix} b(p, \tau_0, f_L, x_M) \\ b(p, \tau_0, f_L, x_{-M}) \\ b(p, \tau_0, 0, x_M) \\ b(p, \tau_0, 0, x_{-M}) \\ b(p, \tau_0, f_{-L}, x_M) \\ b(p, \tau_0, f_{-L}, x_{-M}) \end{matrix}$$

and wherein element $b(p, \tau_0, f_D, X_M)$ corresponds to a single slowness, a single intercept, a single frequency L, and a single spatial position M.

8. The method of claim 1, wherein the plurality of source elements in the time distributed firing source array are moving, and wherein source positions comprise source positions at source firing, wherein the source position differ among the source elements by an amount that is a product of a time interval between the firing of the source element and the velocity of the source element.

9. The method of claim 1, wherein the time-distributed seismic data comprises aliased data.

10. The method of claim 1, wherein the time-distributed seismic data comprises time-distributed seismic data generated from a group of shots fired at a group of spatial locations.

11. The method of claim 10, further comprising:
converting the time-distributed seismic data from a source shot location domain to a wavenumber domain or a slowness domain; and
converting the time-distributed seismic data in the wavenumber domain or the slowness domain back to the source shot location domain, respectively.

12. A system for acquiring impulsive source data using a time-distributed source comprising multiple source elements fired in a sequence in time, the system comprising:
at least one time-distributed source comprising multiple source elements fired in the sequence in time;
a plurality of receivers; and
a controller containing at least one processor and at least one computer readable storage and configured to communicate with the sources and the receivers, wherein the computer readable storage comprises computer executable instructions, which when executed by the processor, causes the controller to:
activate the multiple source elements in the time-distributed source according to a sequence at each source location; and
acquire time-distributed data from the receivers and store the time-distributed data in the at least one computer readable storage;
wherein:
the processor is configured to convert the time-distributed data into impulsive data using a multiple frequency approach as provided in claim 1.

13. The system of claim 12, further comprising a towing vessel, wherein the controller is onboard the vessel.

14. The system of claim 12, further comprising:
a seismic processor configured to generate an image of an interior of the Earth from the converted data.

15. A data processing system for converting acquired time-distributed source data to impulsive source data, the system comprising:
a processor; and
a computer readable storage containing simultaneous source data and computer executable instructions, which, when executed by the processor, cause the processor to perform a method as in claim 1.

16. The method of claim 1, further comprising:
transforming the time-distributed seismic data from a time domain to a frequency domain, and determining the time-distributed source signature from the time-distributed seismic data in the frequency domain.

17. The method of claim 16, wherein selecting a window of frequencies includes selecting a window that spans multiple frequencies and a frequency notch and wherein convolving the impulsive signature with the basis functions and applying the weighting factors to form impulsive seismic data from the acquired time-distributed seismic data includes eliminating the notch using multiple frequencies in the selected window.

* * * * *